(12) United States Patent
Kenmochi

(10) Patent No.: US 8,248,697 B2
(45) Date of Patent: Aug. 21, 2012

(54) METHOD FOR MANUFACTURING AN OPTICAL ELEMENT TO POLARIZE AND SPLIT INCIDENT LIGHT

(75) Inventor: Nobuhiko Kenmochi, Shiojiri (JP)

(73) Assignee: Seiko Epson Corporation (JP)

( * ) Notice: Subject to any disclaimer, the term of this patent is extended or adjusted under 35 U.S.C. 154(b) by 323 days.

(21) Appl. No.: 12/633,981

(22) Filed: Dec. 9, 2009

(65) Prior Publication Data

US 2010/0182692 A1    Jul. 22, 2010

(30) Foreign Application Priority Data

Jan. 20, 2009    (JP) .................................. 2009-009619

(51) Int. Cl.
  *G02B 5/30*    (2006.01)

(52) U.S. Cl. .......... 359/485.05; 359/576; 430/2; 216/24
(58) Field of Classification Search .................. None
  See application file for complete search history.

(56) References Cited

U.S. PATENT DOCUMENTS

| 7,570,424 | B2 * | 8/2009 | Perkins et al. ........... 359/485.05 |
| 7,755,718 | B2 * | 7/2010 | Amako et al. ................... 349/96 |
| 7,800,823 | B2 * | 9/2010 | Perkins ..................... 359/485.05 |
| 2009/0135355 | A1 * | 5/2009 | Kumai .......................... 349/114 |
| 2010/0328768 | A1 * | 12/2010 | Lines et al. .................... 359/486 |

FOREIGN PATENT DOCUMENTS

JP    2006-133257    5/2006

* cited by examiner

*Primary Examiner* — Arnel C Lavarias
(74) *Attorney, Agent, or Firm* — Harness, Dickey & Pierce, P.L.C.

(57) ABSTRACT

A method for manufacturing an optical element that has a function to polarize and split incident light includes: a) forming a grid portion on a face of a substrate in a plural number with a predetermined pitch; b) forming a diffractive structure resist pattern on the face of the substrate; c) forming the diffractive structure by etching the substrate anisotropically in a thickness direction with the diffractive structure resist pattern; and d) forming a fine line on the grid portion by depositing a reflective material from an oblique direction onto the face of the substrate where the diffractive structure is provided.

5 Claims, 4 Drawing Sheets

METHOD FOR MANUFACTURING AN OPTICAL ELEMENT TO POLARIZE AND SPLIT INCIDENT LIGHT

CROSS-REFERENCE TO RELATED APPLICATION

This application is based on and claims priority from Japanese Patent Application No. 2009-009619, filed on Jan. 20, 2009, the contents of which are incorporated herein by reference.

BACKGROUND

1. Technical Field

The present invention relates to a method for manufacturing an optical element that has a polarizing beam-splitting function. The invention also relates to an optical element.

2. Related Art

Among optical elements having a polarizing beam-splitting function, there is known a polarizing beam-splitting element of a wire grid type. JPA-2006-133275 is an example of related art. The wire grid type polarizing beam-splitting element is manufactured for example through the following steps. A concavo-convex structure, which serves as a diffractive structure, is firstly formed on a light transmissive substrate by using a photolithography method, an etching method or the like. Subsequently an aluminum film that covers a surface of the concavo-convex structure is formed. The aluminum film is then patterned so as to form fine metal lines that have a stripe shaped pattern on the concavo-convex structure by using a photolithography method, an etching method or the like.

According to the above-described method for manufacturing the optical element, in the step where the aluminum film provided on the concavo-convex structure of the substrate is patterned by a photolithography method or an etching method, resist that covers the aluminum film is firstly formed and the resist is subsequently exposed so as to obtain a desired pattern of the fine metal lines.

The diffractive structure requires a depth of at least around 100 nm in the concavo-convex face, which makes it almost impossible to apply a low-viscosity resist that is made for nano-fabrication in a thin and uniform layer onto such concavo-convex face. In order to leave the resist on the convex portion (a part protruded from the substrate side) in sufficient thickness, the concave portion (a part dented toward the substrate side) is inevitably filled with the resist. Thereby the depth of the resist in the concave portion largely differs from that in the convex portion.

In consequence, the amount of light absorption by the resist differs between the concave portion and the convex portion when the exposure is carried out. More specifically, insufficient exposure occurs in the concave portion while excessive exposure occurs in the convex portion, accordingly a width of the resist in a shorter direction becomes large at the concave portion and a width of the resist in a shorter direction becomes small at the convex portion.

As a result, widths of the fine metal lines in the shorter direction are made not uniform since they are fabricated by etching that uses the above-described resist. With such fine metal lines, it is impossible to improve a transmission rate or contrast (an extinction ratio) of the polarizing element in full measure.

Meanwhile, the resist for the fine metal lines can be formed by a nano-imprinting method instead of the photolithography method. However it is difficult to align and imprint a resist pattern that reaches the bottom for an appropriate etching onto the concavo-convex face, and it significantly impairs efficiency in terms of mass production and the like.

SUMMARY

An advantage of the present invention is to provide a method for manufacturing an optical element with which uniform fine lines can be provided on a diffractive structure of a substrate and it is possible to improve optical performance. Another advantage of the invention is to provide an optical element thereof.

According to one aspect of the invention, a method for manufacturing an optical element that has a function to polarize and split incident light includes: a) forming a grid portion on a face of a substrate in a plural number with a predetermined pitch, b) forming a diffractive structure resist pattern on the face of the substrate, the diffractive structure resist pattern corresponding to a diffractive structure that has a plurality of concave portions and a plurality of convex portions, the concave portions and the convex portions being arranged alternatively on the face of the substrate, c) forming the diffractive structure by etching the substrate anisotropically in a thickness direction with the diffractive structure resist pattern, and d) forming a fine line on the grid portion by depositing a reflective material from an oblique direction onto the face of the substrate where the diffractive structure is provided, the fine line being provided in a direction in which the grid portion extends.

According to the method, the grid portion can be formed while the face of the substrate is flat so that the width of the grid portion in the shorter direction becomes uniform. In the face of the substrate on which the grid portions having the uniform width, a part which is not covered with the resist is anisotropically etched in the thickness direction of the substrate. After the etching, the part exposed from the resist turns into the concave portion of the diffractive structure, while the width of the grid portion in the shorter direction remains unchanged. At the same time, the part covered with the resist turns into the convex portion of the diffractive structure. In this way, it is possible to equalize the width of the grid portion that is provided in the concave portion to the width of the grid portion that is provided in the convex portion, both the width is measured in the shorter direction of the grid portion. In other words, it is possible to form the grid portion whose width in the shorter direction is uniform in the concave portion and the convex portion of the diffractive structure. Consequently it is possible to improve the optical performance of the optical element.

It is preferable that the step a) include e) forming a grid portion resist pattern that corresponds to the grid portion on the face of the substrate by a photolithography method, and f) etching the substrate anisotropically in the thickness direction with the grid portion resist pattern.

In this way, the grid portion resist pattern can be formed while the face of the substrate is flat. Thereby it is possible to make the exposure condition of the grid portion resist pattern uniform. Consequently it is possible to form a resist pattern having a stripe shape that corresponds to the pattern of the grid portion and whose lines are uniform in width in the shorter direction.

It is also preferable that the anisotropic etching processes performed in the step c) and the step f) be a dry-etching process that uses the same etching gas.

In this way, it is possible to simplify the manufacturing processes and the manufacturing equipment, the productivity can be increased, and the manufacturing cost can be reduced compared with a case where different types of etching gas are used.

It is also preferable that the step e) include forming a resist layer on the face of the substrate, exposing the resist layer by dual beam interference exposure, and developing the exposed resist layer.

In this way, it is possible to obtain a resist pattern having a striped shape whose line width is uniform in a shorter direction by exposing the flat resist layer formed on the flat substrate with an interfering light ray that has a fringe pattern.

It is also preferable that in the step a), the grid portion be disposed so as to cross a direction in which the concave portions and the convex portions extend.

In this way, it is possible to make the extending direction of the grid portion different from the extending direction of the concave portions and the convex portions of the diffractive structure.

According to another aspect of the invention, an optical element that has a function to polarize and split incident light includes a substrate, a diffractive structure having a plurality of concave portions and a plurality of convex portions, the concave portions and the convex portions being arranged alternatively on a face of the substrate, a grid portion provided in a plural number with a predetermined pitch along a surface of the diffractive structure, and a fine line provided on the grid portion along a direction in which the grid portion extends. In the element, the grid portions have a uniform width in a shorter direction in the convex portions and in the concave portions.

In this way, it is possible to improve an optical performance of the optical element compared with the case where the width of the grid portion formed in the concave portion of the diffractive structure is made unequal to the width of the grid portion formed in the convex portion, both the width is measured in the shorter direction of the grid portion.

It is preferable that fine lines have a uniform width in a shorter direction in the concave portions and the convex portions.

In this way, it is possible to improve an optical performance of the optical element compared with the case where the width of the fine line formed in the concave portion of the diffractive structure is made unequal to the width of the fine line formed in the convex portion, both the width is measured in the shorter direction of the grid portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
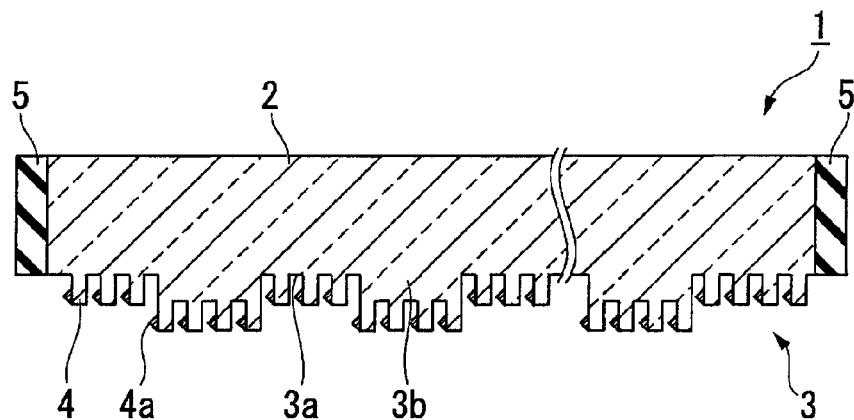
FIGS. 1A through 1C schematically illustrate a sectional structure of an optical element according to one embodiment of the invention.

Embodiments of the invention will be described. In the drawings which will be referred in the following description, a scale size may be different in each member or layer in order to make each member or layer recognizable.

Figure 1B:
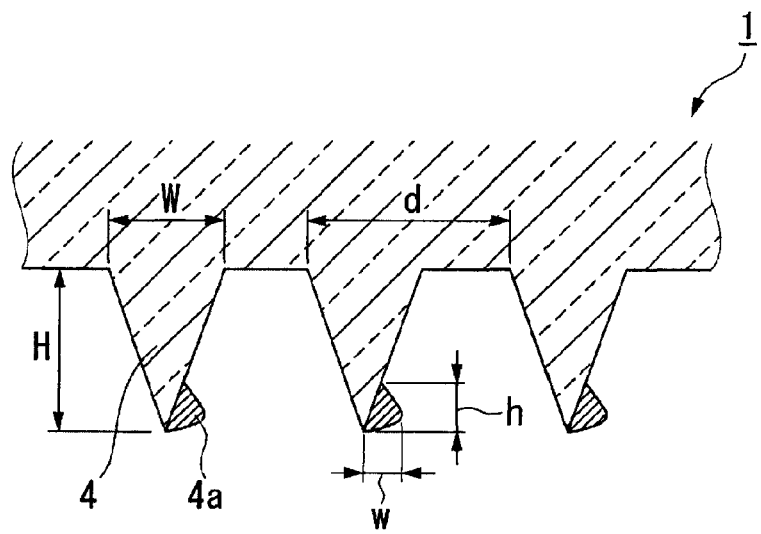
Figure 1C:
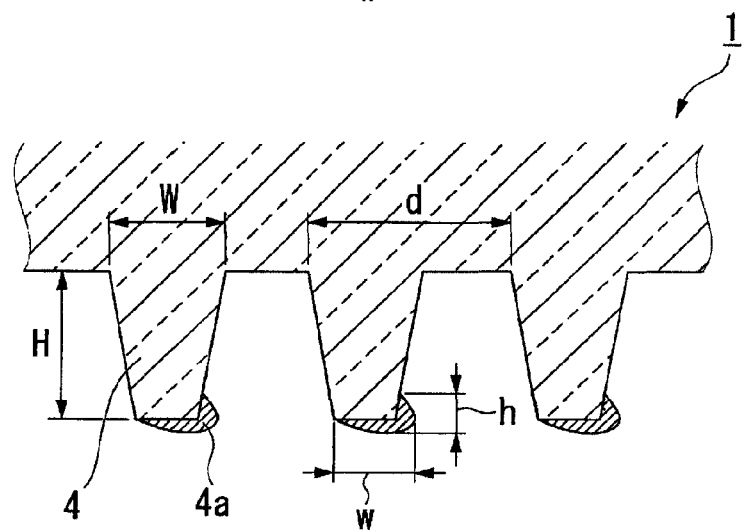

FIG. 1A schematically illustrates a sectional structure of an optical element according to an embodiment of the invention. FIGS. 1B and 1C are enlarged views of FIG. 1A.

Referring to FIG. 1A, an optical element 1 according to the embodiment includes a substrate 2, a diffractive structure 3, a grid portion 4 and a light absorber 5. The optical element 1 has a function to polarize and separate incident light with the grid portion 4.

The substrate 2 is transparent to wavelength of the incident light. For the substrate 2, a substrate made of an inorganic material such as a glass (quartz) substrate can be adopted. A thickness of the substrate 2 is for example about 0.7 mm. On one side of the substrate 2, the diffractive structure 3 is provided. The other side of the substrate 2 has a flat surface as shown in the drawing.

The diffractive structure 3 is formed on one side of the substrate 2. The diffractive structure 3 includes a concave portion 3a and a convex portion 3b which are alternately arranged and provided in a plural number. The pitch and the depth of the concave portion 3a and the convex portion 3b are determined depending on a refractive index of the material forming the substrate 2 and a wavelength of the incident light. For instance, in the case of a green light wavelength, the pitch is around 500 nm and the depth is about 100 nm. Though the reference numbers 3a and 3b are given to only a single set of the concave portion and the convex portion in the drawing, this is for the sake of simplicity and it comes near to stating the obvious that these portions are provided in the plural number.

A cross-sectional shape of the diffractive structure 3 that includes the concave portion 3a and the convex portion 3b is a rectangle as illustrated in the drawing. The diffractive structure can also have some tapered shape. In this embodiment, the diffractive structure 3 is formed by processing one side of the substrate 2. In other words, the diffractive structure 3 is fabricated so as to form a single body with the substrate 2.

The grid portion 4 is disposed on the one side of the substrate 2 and along the upper face of the diffractive structure 3. In each grid portion 4, a fine line 4a that extends in a direction in which the grid portion 4 extends is provided. Though the reference number 4a is given to only a single fine line in the drawing, this is for the sake of simplicity and it comes near to stating the obvious that the fine line is provided in a plural number. The grid portions 4 are formed by processing one side of the substrate 2. The grid portions 4 can also be formed by providing a thin film of such as $SiO_2$ on the substrate 2 and then processing the film to obtain the grid portion. The fine lines 4a are made of a metal film such as aluminum. The fine lines can also be made of other metals instead of Al provided that a desired reflectance is obtained.

Though a cross-sectional shape of the grid portion 4 is a rectangle in FIG. 1A, it can be a triangle shape as shown in FIG. 1B or a trapezoidal shape as shown in FIG. 1C in the actual optical element 1.

Referring to FIG. 1B, when the cross-sectional shape of the grid portion 4 is a triangle, the dimension of the grid portion 4 is for example given as follows: the pitch "d" is about 144 nm, the width W (in the shorter direction) is about 60 to 80 nm, the height H is about 140 nm, the width "w" of the fine line 4a is about 10 to 30 nm, and the height of the fine line 4a is about 10 to 30 nm.

Referring to FIG. 1C, when the cross-sectional shape of the grid portion 4 is a trapezoid, the dimension of the grid portion 4 is for example given as follows: the pitch "d" is about 144 nm, the width "W" (in the shorter direction) is about 60 to 80 nm, the height H is about 150 nm, the width "w" of the fine line 4a is about 20 to 50 nm, and the height of the fine line 4a is about 10 to 30 nm.

In the optical element 1 according to the embodiment, the width "W" of the grid portion 4 that is provided in the concave portion 3a of the diffractive structure 3 is made substantially same as the width "W" of the grid portion 4 that is provided in the convex portion 3b of the diffractive structure 3, both the width "W" is measured in the shorter direction. In addition, the width "w" of the fine line 4a that is disposed in the concave portion 3a of the diffractive structure 3 is made substantially same as the width "w" of the fine line 4a that is disposed in the convex portion 3b of the diffractive structure 3, both the width "w" is measured in the shorter direction. In other words, the grid portion 4 and the fine line 4a have the uniform width "W" and width "w" respectively in the concave portion 3a and the convex portion 3b.

The light absorber 5 is provided at each edge of the substrate 2. The light absorber 5 is made of for example a darkly-colored resin film. A diffracted light ray which is emitted from the diffractive structure 3 and then fully reflected by the interface between the other face of the substrate 2 and the air enters into the light absorber 5. The light absorber 5 absorbs or attenuates the entered diffracted light ray. The light absorber 5 can be disposed so as to contact with the edge of the substrate 2 or can be disposed separate from the edge of the substrate 2.

Mechanism of the optical element 1 according to the embodiment will be now described.

A light ray which comes from a face which opposes the face of the substrate 2 where the grid portion 4 is formed, goes through the substrate 2 then enters into the grid portion 4. The grid portion 4 reflects a component (a TE polarization component) of the entered light ray that has a polarizing axis parallel with the direction in which the fine line 4a extends (a longitudinal direction). A component "s" (a TE polarization component) of the entered light ray, which is the component whose polarizing axis crosses orthogonally to the direction in which the fine line 4a extends, goes through the grid portion 4. In other words, the grid portion 4 holds a function (the polarizing beam-splitting function) to split an incident light ray into a reflected light ray and a transmitted light ray whose polarization states are different each other.

The TE polarization component which has been reflected by the grid portion 4 is diffracted at a large angle by the mechanism of the diffractive structure 3. The diffracted TE polarization component is then fully reflected by the interface between the air and the substrate 2, propagates through the substrate 2 and proceeds towards the edge of the substrate 2. When the light absorber 5 is provided on the substrate 2 as described above, the TE polarization component propagating through the substrate 2 is absorbed by the light absorber 5. In this way it is possible to prevent the incident light ray entered into the substrate 2 from going back towards a light source side.

The concave portion 3a and the convex portion 3b can be disposed so as to cross the direction in which the grid portion 4 extends. Though the concave portions 3a and the convex portions 3b are arranged in a single-dimensional way in the example shown in FIG. 1A, the concave portions 3a and the convex portions 3b can be arranged in a two-dimensional way.

An example of a method for manufacturing the optical element 1 will be described.

FIGS. 3 and 4 schematically illustrate processes in the example of the method for manufacturing the optical element 1, and these drawings are enlarged sectional views of a part of the optical element 1.

Grid Portion Fabrication Process

Figure 2A:
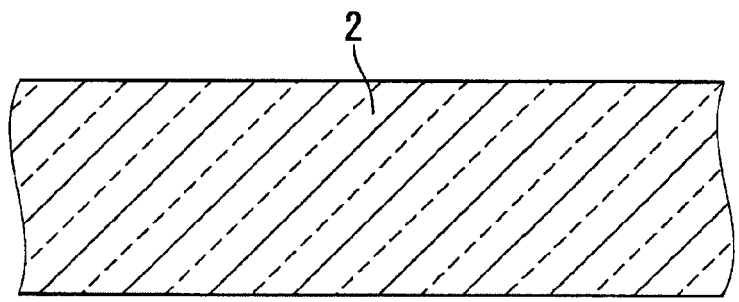
FIGS. 2A through 2C schematically illustrate processes in one example of a method for manufacturing an optical element according to another embodiment of the invention.

Referring to FIG. 2A, the substrate 2 made of an inorganic material such as a glass substrate (quartz substrate) is provided and the grid portion 4 is fabricated on a face of the substrate 2. This fabrication process can be realized by adopting a commonly-known photolithography or etching method.

Figure 2B:
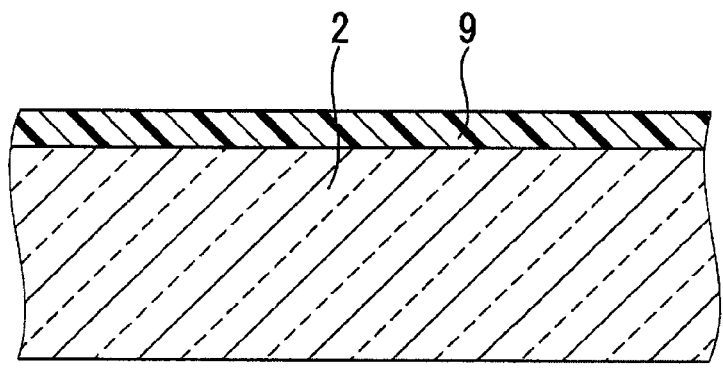

More specifically, referring to FIG. 2B, a light-sensitive film (a resist layer) 9 is provided on the face of the substrate 2.

Figure 2C:
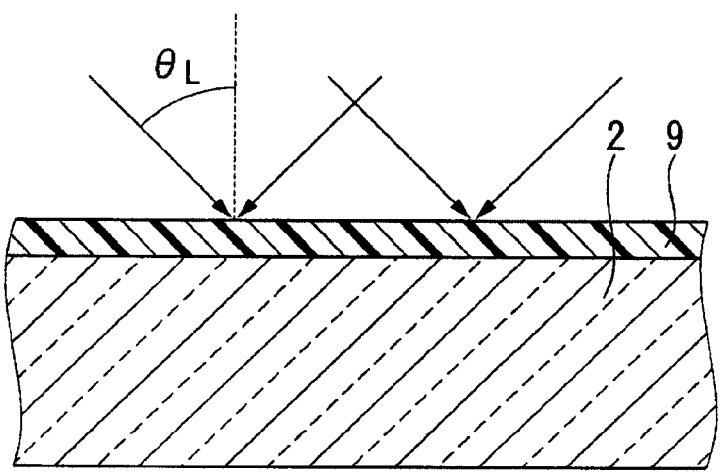

With reference to FIG. 2C, the light-sensitive film 9 formed on the face of the substrate 2 is then exposed by carrying out laser interference exposure (dual beam interference exposure). As a light source used for the laser interference exposure, for example, a continuous oscillation deep ultra violet (DUV) laser with a wavelength of 266 nm can be used. A laser beam emitted from the laser is split into two laser beams and the two laser beams are made to cross each other at a predetermined angle $\theta_L$ as shown in the drawing, generating a light beam (a interfering light ray) that has a fringe pattern consisting of periodic light-dark parts.

The pitch of the fringe (the pitch of the light-dark parts) is determined by the above-mentioned crossing angle $\theta_L$. For example, the pitch of the fringe pattern can be made about 144 nm by setting the predetermined angle $\theta_L$ to about 72°. By exposing the light-sensitive film 9 to such interfering light, a latent image pattern corresponding to the pitch of the fringe is formed in the light-sensitive film 9. At this point, an anti-reflection film can be disposed under the light-sensitive film 9.

Figure 3A:
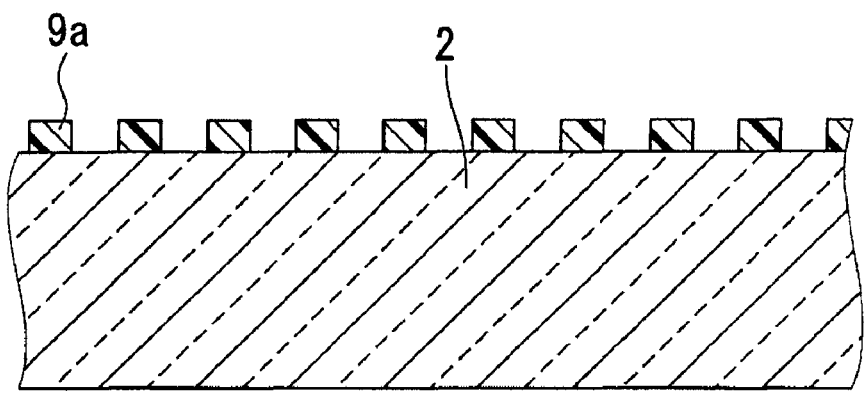
FIGS. 3A through 3C schematically illustrate processes in the example of the method for manufacturing an optical element.

Referring to FIG. 3A, the light-sensitive film 9 in which the latent image pattern has been formed by using the interfering light is subsequently developed. Consequently a light-sensitive film pattern 9a (a resist pattern for the grid portion) that has the pitch corresponding to the pitch of the fringe is provided as shown in the drawing. For example, when the pitch of the fringe is about 144 nm, the pitch of the light-sensitive film pattern 9a becomes about 144 nm (a grid portion resist pattern fabrication process).

Figure 3B:
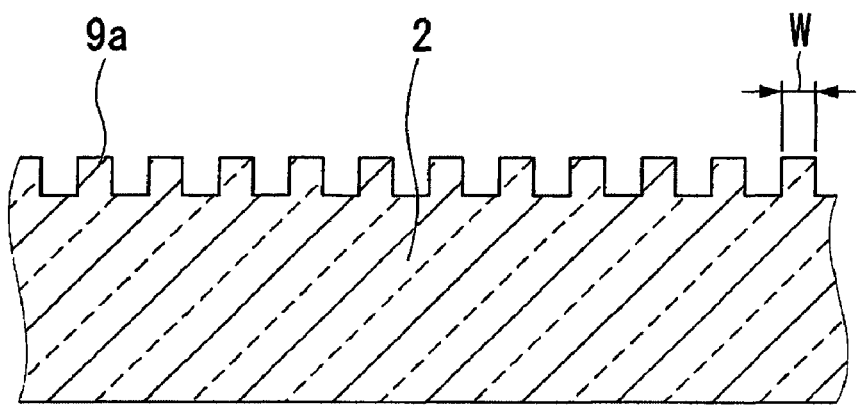

The substrate 2 is etched (for example through anisotropic dry-etching) in a thickness direction by using the light-sensitive film pattern 9a as a mask. Through this process, the pattern of the light-sensitive film pattern 9a is transferred to the substrate 2. The light-sensitive film pattern 9a is then removed. The grid portion 4 is fabricated on the face of the substrate as shown in FIG. 3B, through the above-described process (a grid portion etching process). At this point, it is possible to obtain the grid portion 4 having the cross-sectional shapes that are illustrated in FIG. 1B and FIG. 1C by adjusting etching conditions. The grid portion 4 can also be formed such that it crosses with the direction in which the concave portion 3a and the convex portion 3b extend.

Diffractive Structure Resist Pattern Fabrication Process

The diffractive structure 3 including the concave portion 3a and the convex portion 3b is formed on the face of the substrate 2. More specifically, a light-sensitive film (a resist film and the like) is formed on the face of the substrate 2 on which the grid portion 4 is formed. The light-sensitive film is then exposed and developed by using an exposure mask that has an exposure pattern corresponding to the concave portion 3a and the convex portion 3b. As a result, the light-sensitive film pattern 10a (a diffractive structure resist pattern) is fabricated as shown in FIG. 3C.

Diffractive Structure Etching Process

Figure 3C:
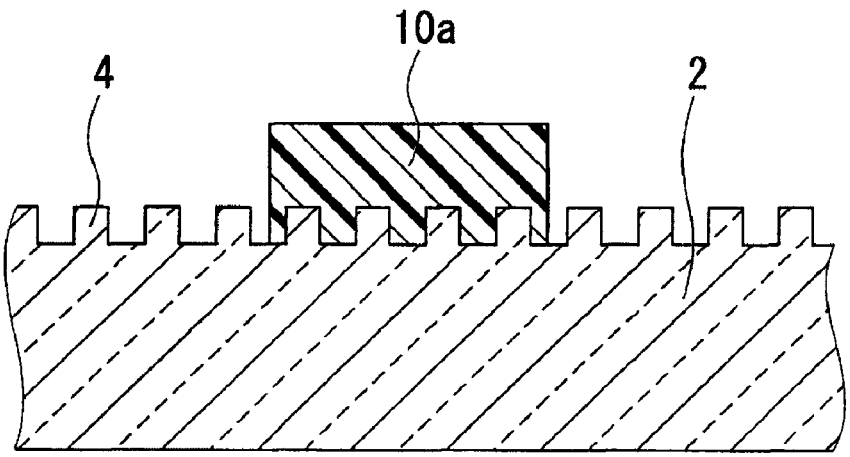

The substrate 2 is then etched anisotropically in a thickness direction by using the light-sensitive film pattern 10a which is illustrated in FIG. 3C as an etching mask and by using a same etching gas with the etching gas that is used in the grid portion fabrication process. The light-sensitive film pattern 10a is then removed. In this way, the pattern of the exposure mask is transferred onto the face of the substrate 2, and the diffractive structure 3 that has a predetermined concavo-convex pattern is obtained.

At this point, the grid portion 4 that is exposed from the light-sensitive film pattern 10a is etched in the thickness direction of the substrate 2 in the same manner as the substrate 2 but hardly etched in the width "W" direction. Thereby the width "W" and the height "H" of the grid portion 4 which is in the concave portion 3a of the diffractive structure 3 become substantially same with the width "W" and the height "H" of the grid portion 4 in the convex portion 3b of the diffractive structure 3 respectively.

It is confirmed by an experiment that the height "H" of the grid portion 4 in the concave portion 3a is reduced about 10 nm but the width "W" remains substantially same when the etching is performed to the extent that the depth of the concave portion 3a of the diffractive structure 3 is increased by about 100 nm. In this case, a satisfactory grid shape can be obtained as the optical element 1 according to the embodiment.

Fine Line Fabrication Process

Figure 4A:
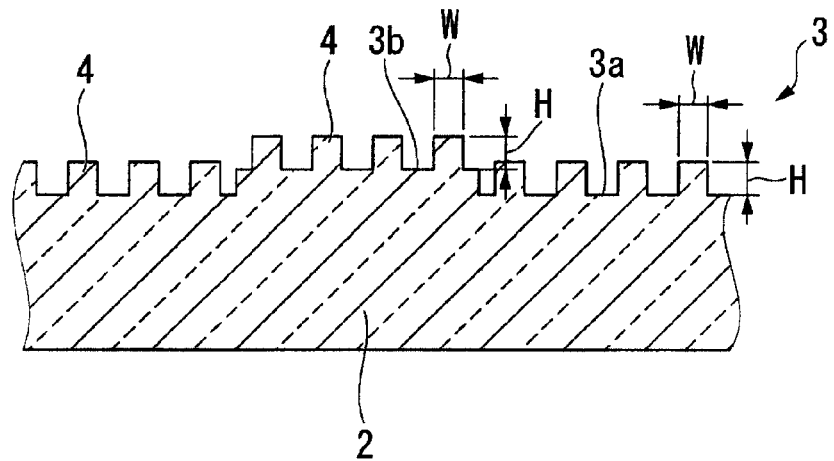
FIGS. 4A and 4B schematically illustrate processes in the example of the method for manufacturing an optical element.
Figure 4B:
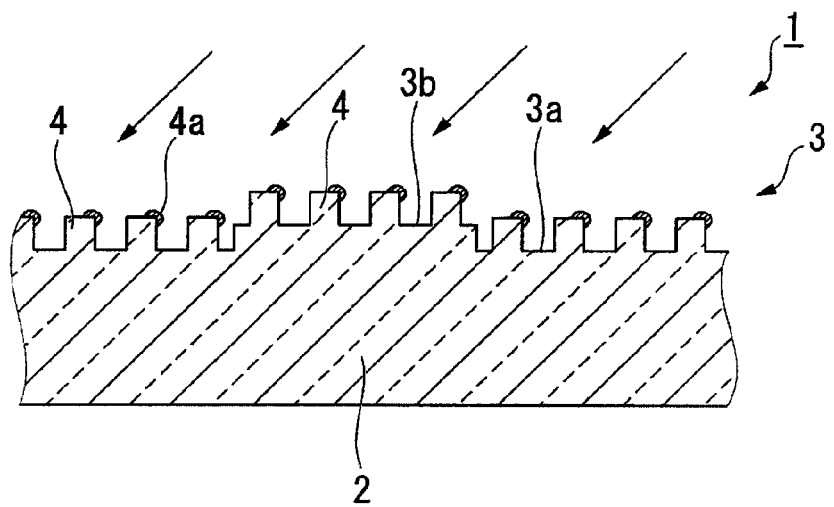

Referring to FIG. 4B, a fine line 4a is formed on the grid portion 4 by depositing a reflective material such as Al from an oblique direction onto the face of the substrate 2 where the diffractive structure 3 is provided. The fine line 4a is formed by for instance a commonly-known sputtering method, an oblique evaporation method or the like. In this way it is possible to form the fine lines 4a that have a uniform width on the grid portions 4 in the concave portion 3a and the convex portion 3b of the diffractive structure 3. Finally, the light absorber 5 is provided on the edge part of the substrate 2 as shown in FIG. 1A. Through the above-described processes, the optical element 1 is completed.

Thereby with the method for manufacturing the optical device 1 according to the embodiment when the grid portion 4 is formed, the light-sensitive film 9 can be exposed through the dual beam interference exposure while the face of the substrate 2 remains flat as shown in FIG. 2C. Therefore it is possible to make the exposure condition of the sensitive film 9 uniform in the face of the substrate 2. Accordingly it is possible to form the light-sensitive film pattern 9a having the stripe shape that corresponds to the pattern of the grid portion 4 and whose lines have a uniform width in the shorter direction as shown in FIG. 3A. As a result, referring to FIG. 3B, the grid portions 4 having the uniform width "W" in the shorter direction can be obtained.

Referring to FIG. 3C, in the face of the substrate 2 where the grid portion 4 having the uniform width W is provided, a part which is exposed from the light-sensitive film pattern 10a is anisotropically etched in the thickness direction of the substrate 2. After the etching, the part exposed from the light-sensitive film pattern 10a turns into the concave portion 3a of the diffractive structure 3 which is illustrated in FIG. 4A, while the width "W" of the grid portion 4 in the shorter direction remains unchanged. At the same time, the part covered with the light-sensitive film pattern 10a, which is illustrated in FIG. 3C, turns into the convex portion 3a of the diffractive structure 3 shown in FIG. 4A.

With the method for manufacturing the polarizing element according to the embodiment, it is possible to equalize the width "W" of the grid portion 4 that is provided in the concave portion 3a of the diffractive structure 3 to the width "W" of the grid portion 4 that is provided in the convex portion 3b, both the width "W" is measured in the shorter direction of the grid portion. In other words, it is possible to form the grid portion 4 whose width "W" in the shorter direction is uniform in the concave portion 3a and the convex portion 3b of the diffractive structure 3. Consequently it is possible to improve the optical performance of the optical element 1.

When the grid part is made of aluminum (Al) having a high-refractivity, it was required to provide an anti-reflection film before resist is applied according to the prior art. In addition, a hard mask should be formed for etching of Al in order to obtain a high etching selectivity with respect to chlorine gas.

Whereas according to the embodiment, the anti-reflection film is not necessary because the resist is formed on a transparent substrate whose reflectivity is low. Moreover, the hard mask is not required since a transparent substrate made of $SiO_2$ series can be easily etched. Furthermore, a same etching gas (fluorine series) can be used for the anisotropic etching of the grid portion 4 and for the anisotropic etching of the diffractive structure 3.

Consequently the invention has advantages that the manufacturing processes and manufacturing equipment can be simplified compared to the hitherto-known techniques, the productivity can be increased, and the manufacturing cost can be reduced.

In the optical element 1 according to the embodiment, the width "W" of the grid portion 4 formed in the concave portion 3a of the diffractive structure 3 is made substantially the same as the width "W" of the grid portion 4 formed in the convex portion 3b, both the width "W" is measured in the shorter direction of the grid portion. Therefore it is possible to improve the optical performance of the optical element 1 compared with the case where the width "W" of the grid portion 4 formed in the concave portion 3a of the diffractive structure 3 is made unequal to the width "W" of the grid portion 4 formed in the convex portion 3b, both the width "W" is measured in the shorter direction of the grid portion.

Moreover, the width "W" of the fine line 4 provided in the concave portion 3a of the diffractive structure 3 is made substantially the same as the width "w" of the fine line 4a formed in the convex portion 3b, both the width "W" is measured in the shorter direction of the grid portion. In other words, the grid portion 4 and the fine line 4a are made uniform in the thickness "W" and the width "w" respectively in the concave portion 3a and the convex portion 3b. Therefore it is possible to improve the optical performance of the optical element 1 compared with the case where the width of the fine line 4a formed in the concave portion 3a is made unequal to the width "W" of the fine line 4 formed in the convex portion 3b, both the width "w" is measured in the shorter direction of the grid portion.

The invention is obviously not limited to the specific embodiments described herein, but also encompasses any variations that may be considered by any person skilled in the art, within the general scope of the invention. For example, a cross-sectional shape of the grid portion shall not be limited to the above-described shapes. The size of the grid shall not be limited to the above described embodiment. Moreover, the fine line can be formed of other material than metal.

What is claimed is:

1. A method for manufacturing an optical element that has a function to polarize and split incident light, comprising:
   a) forming a grid portion on a face of a substrate in a plural number with a predetermined pitch;
   b) forming a diffractive structure resist pattern on the face of the substrate, the diffractive structure resist pattern corresponding to a diffractive structure that has a plurality of concave portions and a plurality of convex portions, the concave portions and the convex portions being arranged alternatively on the face of the substrate;
   c) forming the diffractive structure by etching the substrate anisotropically in a thickness direction with the diffractive structure resist pattern; and
   d) forming a fine line on the grid portion by depositing a reflective material from an oblique direction onto the face of the substrate where the diffractive structure is provided, the fine line being provided in a direction in which the grid portion extends.

2. The method for manufacturing an optical element according to claim 1, wherein the step a) includes:
   e) forming a grid portion resist pattern that corresponds to the grid portion on the face of the substrate by a photolithography method; and
   f) etching the substrate anisotropically in the thickness direction with the grid portion resist pattern.

3. The method for manufacturing an optical element according to claim 2, wherein the anisotropic etching processes performed in the step c) and the step f) are a dry-etching process that uses a same etching gas.

4. The method for manufacturing an optical element according to claim 2, wherein the step e) includes:
   forming a resist layer on the face of the substrate;
   exposing the resist layer by dual beam interference exposure; and
   developing the exposed resist layer.

5. The method for manufacturing an optical element according to claim 1, wherein the step a), the grid portion is disposed so as to cross a direction in which the concave portions and the convex portions extend.

* * * * *